United States Patent
Yuasa et al.

(10) Patent No.: US 7,337,014 B2
(45) Date of Patent: Feb. 26, 2008

(54) TEACH PENDANT CONTROL METHOD AND DEVICE

(75) Inventors: Keijiro Yuasa, Fukuoka (JP); Takeshi Horibe, Fukuoka (JP); Michiharu Tanaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 137 days.

(21) Appl. No.: 10/559,336

(22) PCT Filed: May 28, 2004

(86) PCT No.: PCT/JP2004/007347

§ 371 (c)(1),
(2), (4) Date: Dec. 5, 2005

(87) PCT Pub. No.: WO2004/109414

PCT Pub. Date: Dec. 16, 2004

(65) Prior Publication Data

US 2006/0138989 A1 Jun. 29, 2006

(30) Foreign Application Priority Data

Jun. 9, 2003 (JP) ............................. 2003-163212

(51) Int. Cl.
*G05B 11/01* (2006.01)
*G05B 15/00* (2006.01)
*G06F 3/00* (2006.01)
*G06F 9/00* (2006.01)
*G06F 17/00* (2006.01)

(52) U.S. Cl. ..................... 700/17; 700/83; 700/264; 715/700; 715/701

(58) Field of Classification Search ................ 700/264, 700/17, 83; 715/700–701
See application file for complete search history.

(56) References Cited

U.S. PATENT DOCUMENTS

| 5,115,179 | A | * | 5/1992 | Fujii et al. ............. 318/568.13 |
| 6,160,324 | A | * | 12/2000 | Terada et al. ................ 307/116 |
| 2003/0018411 | A1 | * | 1/2003 | Suita et al. .................. 700/245 |
| 2003/0184164 | A1 | * | 10/2003 | Fukui et al. ................. 307/326 |
| 2004/0065535 | A1 | * | 4/2004 | Fukui et al. ................. 200/553 |
| 2006/0138989 | A1 | * | 6/2006 | Yuasa et al. ........... 318/568.13 |
| 2006/0212167 | A1 | * | 9/2006 | Nobuhiro et al. ........... 700/245 |

FOREIGN PATENT DOCUMENTS

| JP | 8-171409 A | 7/1996 |
| JP | 2002-83522 A | 3/2002 |
| JP | 2002-355781 A | 12/2002 |

* cited by examiner

*Primary Examiner*—Ronald D Hartman, Jr.
(74) *Attorney, Agent, or Firm*—Sughrue Mion, PLLC

(57) ABSTRACT

When a teach pendant is passed from one hand to the other hand in operating the teach pendant having two enable devices (three-position switches) at right and left sides, a problem arises that an operation is inhibited when the teach pendant is shifted from one hand to the other hand. Even when the three-position switches are operated by both the hands during shifting the teach pendant from one hand to the other hand, the operation can be performed Until a prescribed time passes. Thus, the teach pendant can be shifted from one hand to the other hand and can be continuously operated. When an operating time by both the hands exceeds the prescribed time, the operation is inhibited, so that a safety is ensured.

6 Claims, 4 Drawing Sheets

FIG. 4

| | STATE | 11 | 12 | 13 | 14 | 15 | 16 | 17 | 18 |
|---|---|---|---|---|---|---|---|---|---|
| CONTACT STATE | 61-1 | ARBITRARY | 0 | 1 | 0 | 1 | 1 | ARBITRARY | ARBITRARY |
| | 61-3 | ARBITRARY | 0 | 0 | 0 | 0 | 0 | 1 | ARBITRARY |
| | 62-1 | ARBITRARY | 0 | 0 | 1 | 1 | 1 | ARBITRARY | ARBITRARY |
| | 62-3 | ARBITRARY | 0 | 0 | 0 | 0 | 0 | ARBITRARY | 1 |
| INNER STATE | POWER-ON | 1 | 0 | 0 | 0 | 0 | 0 | 0 | 0 |
| | INHIBITION DETECTING | ARBITRARY | 0 | 0 | 0 | 0 | 1 | 1 | 1 |
| | TIMING | 0 | 0 | 0 | 0 | 0 | 1 | ARBITRARY | ARBITRARY |
| | EXCESS OF TIME | 0 | 0 | 0 | 0 | 0 | 1 | ARBITRARY | ARBITRARY |
| RELAY OUTPUT | | OFF | OFF | ON | ON | ON | OFF | OFF | OFF |

TEACH PENDANT CONTROL METHOD AND DEVICE

TECHNICAL FIELD

The present invention relates to a control method for a teach pendant used for a manipulation for teaching an operation to devices such as industrial robots or machine tools, and more particularly to an improvement of a control method for permitting or inhibiting the operation of the device by a teach pendant.

BACKGROUND ART

Usually, in the production line of a factory, many industrial robots for automatically performing a welding operation, an attaching operation of parts, a conveying operation or the like are employed. Prescribed operations are previously taught to the industrial robots by exclusive teach pendants and the robots perform various kinds of operations by reproducing the contents of teaching. The teach pendant is also ordinarily referred to as a teach device. A similar teach pendant is used for teaching (program) working procedures of various kinds of machine tools, NC machine tools, etc.

A teaching operator ordinarily holds such a teach pendant by one hand and performs operations for input keys by the other hand to teach the machines. In this case, the industrial robots or the NC machine tools as objects to be taught (refer generally them to as a device, hereinafter) sequentially carry out operations respectively for steps in accordance with a teaching operation. For example, a driving operation of a motor, a swing operation of an arm, an operation for turning on a work head (for instance, a welding gun) or the like are performed. At this time, the device may sometimes make an operation different from that intended by the teaching operator owing to a mistake in teaching operation or the defects of the parts of the device. In such a case, to avoid a danger to operators in the vicinity of the device including the teaching operator and prevent the device and peripheral devices from being broken, a safety system of the device needs to be constructed so that the teaching operation is immediately inhibited or the device is quickly stopped.

Accordingly, in the usual teach pendant, at the time of the operation that is not intended by the teaching operator as described above, an enable switch is employed so that the teaching operation is assuredly inhibited and the device is immediately stopped. Further, the enable switch is arranged at both sides of the teach pendant for the whip hand of the teaching operator or for the purpose of improving the efficiency of the teaching operation, and proposed and used so as to be operated by both the hands.

Since muscles wither due to a surprise or an electric shock when a danger impends to a human being, for instance, the hands are held tightly. Therefore, for the enable switch, a three-position switch of a momentary type is used. A state that the teach pendant is not gripped is located at a below-described first operation.

To obtain a permitting state that the operation of the device is permitted and an inhibiting state that the operation of the device is inhibited, a below-described enable contact signal of the three-position switch is outputted to the device. An enable contact is constructed so as to open to have the inhibiting state that the operation of the device is inhibited when a pressing-down stroke is operated to be located in the first operating position smaller than a prescribed range and to be located in a third operating position larger than the prescribed range, and so as to close to have the permitting state that the operation of the device is permitted when the pressing-down stroke is operated to be located in a second position within the prescribed range. Further, when the enable contact is placed at the third operating position once, in the second operating position where the pressing-down stroke is mitigated until the enable contact is placed at the first operating position, the enable contact is not closed to maintain the inhibiting state that the operation of the device is inhibited.

For instance, the teaching operator may hold the teach pendant by a left hand and carries out the teaching operation by a right hand, or vice versa. Further, in the teaching operation for a long time, by considering the fatigue of fingers or hands, the three-position switches are arranged at two positions including a part which left fingers touch and a part which right fingers touch so that the teach pendant can be arbitrarily shifted from one hand to the other hand. The two three-position switches can respectively permit the device to be operated.

Further, the three-position switches are desirably constructed so that when one three-position switch is located at the third operating position, the inhibiting state that the operation of the device is inhibited is established until both the three-position switches are placed at the first operating positions, as proposed in Patent Document 1 and patent Document 2.

Patent Document 1: JP-A-2002-355781

Patent Document 2: JP-A-2002-83522

In an embodiment disclosed in the Patent Document 1, when one three-position switch is gripped and held at the second operating position, an enable contact is closed to obtain a permitting state that the operation of a device is permitted. Then, when the other three-position switch is operated to be located at the second operating position, the enable contact is opened to obtain an inhibiting state that the operation of the device is inhibited. That is, only when one three-position switch is placed at the second operating position, the permitting state for permitting the operation of the device is obtained.

In an embodiment disclosed in the Patent document 2, when one three-position switch is held at the second operating position, an enable contact is closed to obtain a permitting state that the operation of a device is permitted. Then, even when the other three-position switch is located at the second operating position, the permitting state for permitting the operation of the device is maintained.

Ordinarily, the teaching operator grips the teach pendant by one hand and carries out an operation for pressing down input keys by the other hand to perform the teaching operation. Generally, in the teaching operation for a long time, the operator has a chance to arbitrarily shift the teach pendant from one hand to the other hand due to the fatigue of fingers or hands. An operating method during shifting the teach pendant from one hand to the other hand includes two methods of (1) that both the three-position switches are opened once to obtain the first operating positions and the other three-position switch is operated to be located at the second operating position, or (2) that both the three-position switches are placed at the second operating positions and the other switch is opened to be located at the first operating position.

DISCLOSURE OF THE INVENTION

Problems that the Invention is to Solve

In the embodiment disclosed in the Patent document 1, according to the above-described two operating methods, the inhibiting states are realized once that the operation of the device is inhibited. Under the inhibiting state that the operation of the device is inhibited depending on the structure or the use of the device, a driving power is interrupted and driving energy is opened to ensure an assured safety. When the inhibiting state is established once, the driving power needs to be turned on and the driving energy needs to be accumulated until the permitting state that the operation of the device is permitted is subsequently established and the device operates.

As described above, when the inhibiting state for inhibiting the operation of the device is realized during shifting the teach pendant from one hand to the other hand, the driving energy needs to be opened and accumulated, so that problems of the loss of time and the loss of energy arise.

In the embodiment disclosed in the Patent Document 2, since both the three-position switches are placed at the second operating position to be located in the permitting states that the operation of the device is permitted, the inhibiting state is not established according to the operating method (2) for shifting the teach pendant from one hand to the other hand. However, when the teaching operator grips the teach pendant by both the hands owing to a surprise for an movement of the device that is not anticipated while the teaching operator grips the teach pendant by one hand to perform the teaching operation, since the permitting state remains that the operation of the device is permitted, a problem arises for a safety.

Thus, the present invention is proposed by considering the above-described problems and it is an object of the present invention to provide a control method for a teach pendant in which an operation can be continuously carried out without interrupting the operation during shifting the teach pendant from one hand to the other hand and a safety is considered in the control method of the teach pendant used when an teaching of an operation or a simulation of the operation is carried out relative to industrial robots or machine tools.

Means for Solving the Problems

For solving the above-described problems, there is provided with a control method for a teach pendant defined in claim 1, the teach pendant including: two three-position switches respectively having three operating positions of first operating positions, second operating positions and third operating positions in accordance with pressing-down strokes, the three-position switch having: a detecting unit for detecting the first operating position and the third operating position to permit or inhibit the operation of a device in accordance with the operating positions, the control method including:

a step of inhibiting the operation of the device, when both the three-position switches are located at the second operating positions for a time exceeding a prescribed time.

There is provided with the control method for a teach pendant defined in claim 2, wherein when both the three-position switches are located at the second operating positions from the first operating positions, the measurement of time is started, and while the measured time is smaller than the prescribed time, when at least one of the three-position switches is located at the position of above-described other positions, the measurement of the time is stopped.

With such a structure, when the teach pendant is passed from, for instance, from a left hand to a right hand, even in a series of operations that the two three-position switches provided in the teach pendant are firstly gripped by the left hand, and gripped by the right hand, and then, the left hand is opened, an inhibiting state that the operation of the device is inhibited is not obtained and the teach pendant can be smoothly shifted from one hand to the other hand, so that a teaching operation can be continuously carried out.

When a teaching operator grips the teach pendant by both the hands owing to a surprise for the operation of the device that is not anticipated, the inhibiting state for inhibiting the operation of the device is established after the prescribed time to improve a safety.

In order to solve the above-described problems, there is provided with a control device for a teach pendant defined in claim 3, the teach pendant including: two three-position switches respectively having three operating positions of first operating positions, second operating positions and third operating positions in accordance with pressing-down strokes, the three-position switch including: a signal processing circuit having a detecting contact for detecting the first operating position and the third operating position to permit or inhibit the operation of a device in accordance with the operating positions, wherein the signal processing circuit has detecting contact signals of the three-position switches as inputs to establish an inhibiting state of the operation of the device when both the three-position switches are located at the second operating positions for a time exceeding a prescribed time, and to allow both the three-position switches to be located at the first operating positions to cancel the inhibiting state of the operation of the device.

According to this structure, even when one hand gripping the teach pendant is changed to the other hand, a permitting state that the operation of the device is permitted is established, so that the teaching operation can be continuously carried out. Further, while both the three-position switches are returned to the first operating positions, the permitting state in which the teaching operation can be performed is prevented from being realized to improve the safety of the operation of the teach pendant.

The control device for a teach pendant defined in claim 4 is characterized in that the signal processing circuit includes a circuit having a relay.

Further, the control device for a teach pendant defined in claim 5 is characterized in that the signal processing circuit includes a circuit having either a logic element or a logic operation element.

Still further, the control device for a teach pendant is characterized in that the signal processing circuit is arranged in a teach pendant main body or the device.

Accordingly, since the signal processing circuit can be easily formed by using the relay, the logic element and the logic operation element and a part or an entire part of the circuit can be disposed in the device from the inner part of the teach pendant main body, the teach pendant gripped by the teaching operator can be miniaturized and light-weighted.

Advantage of the Invention

As described above, according to the control method for a teach pendant of the present invention, when one hand gripping the teach pendant is changed to the other hand, the inhibiting state that the operation of the device is inhibited is not established so that the teaching operation can be continuously carried out, and when the teaching operator holds the teach pendant by both hands owing to a surprise for the operation of the device that is not expected, the inhibiting state for inhibiting the operation of the device is realized. Thus, the teach pendant with a high safety can be effectively provided.

BRIEF DESCRIPTION OF THE DRAWINGS

[FIG. 4] is a signal processing table of the second embodiment for embodying the present invention.

DESCRIPTION OF REFERENCE NUMERALS AND SIGNS

Figure 1:
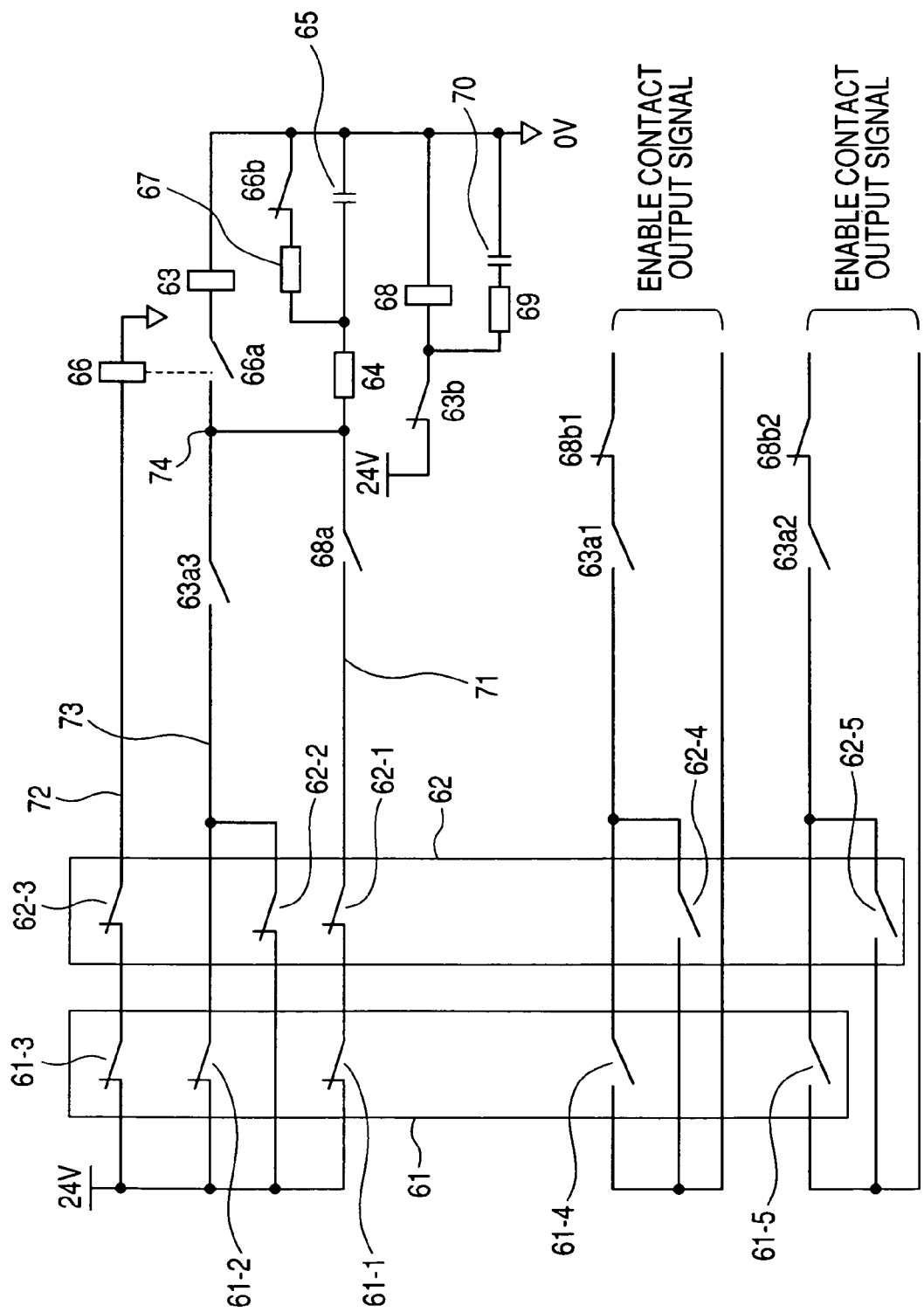
[FIG. 1] is a circuit block diagram of a first embodiment-for embodying the present invention.

61 three-position switch for left hand
62 three-position switch for right hand
61-1, 61-2, 62-1, 62-2 operation detecting contact
61-3, 62-3 third position detecting contact
61-4, 61-5, 62-4, 62-5 enable contact
63, 66, 68 relay
64, 67, 69 resistor
65, 70 condenser
71 operation detecting line
72 third operating position detecting line
73 both switch operation detecting line
81, 84 voltage converter
82, 85 signal processing circuit
83, 86 relay

BEST MODE FOR CARRYING OUT THE INVENTION

Now, specific embodiments of the present invention will be described below by referring to the drawings.

FIRST EMBODIMENT

FIG. 1 a circuit block diagram of a first embodiment for embodying the present invention. Electric articles such as switches and relays forming a circuit are divided and arranged in a teach pendant not shown in the drawing or the teach pendant and a device that is not illustrated.

Reference numeral 61 designates a three-position switch for a left hand and has three operating states of a first operating position, a second operating position and a third operating position. Enable contacts 61-4 and 61-5 close the circuit in the second operating position and open the circuit in other positions than the second operating position. Operation detecting contacts 61-1 and 61-2 as auxiliary contacts close the circuit in the first operating position and open the circuit in other positions than the first operating positions. Further, a third operating position detecting contact 61-3 as an auxiliary contact is provided that opens the circuit in the third operating position and closes the circuit in other positions than the third operating position. Likewise, a three-position switch 62 for a right hand is equipped with operation detecting contacts 62-1 and 62-2, a third operating position detecting contact 62-3 and enable contacts 62-4 and 62-5.

The third operating position detecting contact 61-3 of the three-position switch 61 for a left hand is connected in series to the third operating position detecting contact 62-3 of the three-position switch 62 for a right hand. In the first embodiment, since a power source has dc 24V, the other side of a relay 66 is connected to 0V and the other part of the third operating position detecting contact 61-3 of the three-position switch 61 for a left hand is connected to the dc 24V (a description of connection to the dc 24V and 0V will be omitted hereinafter).

This circuit line is a third operating position detecting line 72 that detects the third operating position, since when at least one three-position switch is placed at the third operating position, the third operating position detecting contact of the three-position switch opens the circuit.

The operation detecting contact 61-1 of the three-position switch 61 for a left hand is connected in series to the operation detecting contact 62-1 of the three-position switch 62 for a right hand to form an operation detecting line 71 for opening the circuit when at least one three-position switch is operated and the operation line detecting line 71 is connected to a constantly opening contact 68a of a relay 68.

The operation detecting contact 61-2 of the three-position switch 61 for a left hand is connected in parallel with the operation detecting contact 62-2 of the three-position switch for a right hand to form a both switch operation detecting line 73 for opening the circuit when both the three-position switches 61 and 62 are operated and the both switch operation detecting line 73 is connected to in series to a constantly opening contact 63a3 of a relay 63. The both switch operation detecting line 73 is connected in parallel with the other side (line 74) of the constantly opening contact 68a of the above-described relay 68 connected to the operation detecting line 71, and then, connected in series to a constantly opening contact 66a of a relay 66 and the relay 63.

Form the line 74, a resistor 64 is connected in series to a condenser 65 and connected to 0V. Further, a resistor 67 is connected in series to a constantly closing contact 66b of the relay 66 and connected in parallel with the condenser 65. When the line 74 is interrupted from the power source 24V under a state in which the constantly opening contact 66a of the relay 66 closes the circuit, the condenser 65 is provided to delay the off-state of the relay 63 for a prescribed time (for instance, one second). The resistor 64 serves to limita current during storage to the condenser 65 and protect a contact across which the stored current is supplied. The constantly closing contact 66b of the relay 66 serves to close the circuit when at least one three-position switch is placed at the third operating position to rapidly discharge electric charge stored in the condenser 65. The resistor 67 protects the constantly closing contact 66b during the rapid discharge.

A constantly closing contact 63b of the relay 63 is connected to the relay 68. A resistor 69 and a condenser 70 connected in series are connected in parallel with the relay 68 to delay the off-state of the relay 68 for a prescribed time.

The enable contact 61-4 of the three-position switch 61 for a left hand is connected in parallel with the enable contact 62-4 of the three-position switch for a right hand, and connected in series to a constantly opening contact 63a1 of the relay 63 and a constantly closing contact 68b1 of the relay 68 to form an enable contact output signal. Other enable contacts 61-5 and 62-5 are likewise connected in parallel with each other, and then, connected in series to a constantly opening contact 63a2 of the relay 63 and a constantly closing contact 68b2 of the relay 68 to form an enable contact output signal. In this embodiment, the enable contact output signal has two systems, because a duplex circuit is formed not so as to harm the safety of a device, even one is failed. In accordance with a request of a system that uses a parts material or a device with a sufficiently high reliability, one system may be adopted or three systems or more may be prepared for use of other purposes.

Figure 2:
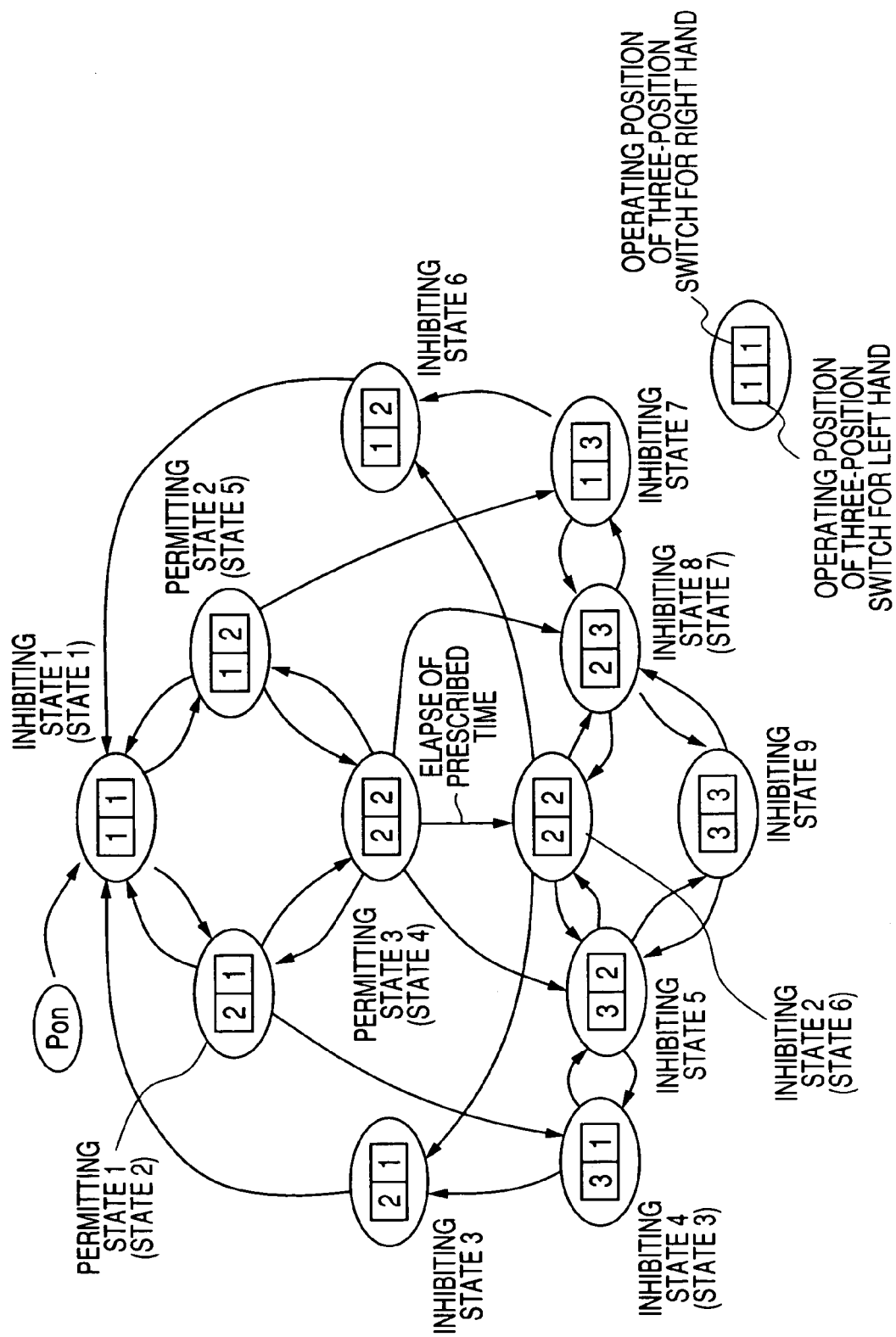
[FIG. 2] is a state transition diagram of the first embodiment for embodying the present invention.

FIG. 2 is a state transition diagram in this embodiment and shows the operating positions of the three-position switches and the permitting state and the inhibiting state of the operation of the device. An operation of the circuit shown in FIG. 1 is described in accordance with a state transition of FIG. 2.

Initially, under a state that both the three-position switches 61 and 62 are not operated, when the voltage 24V of the power source is turned on (state Pon), the third position detecting contacts 61-3 and 62-3 of the three-position switches 61 and 62 close the circuit, so that the current is supplied to the relay 66 connected thereto to excite and turn on the relay 66. On the other hand, since the initial state of the relay 63 is an off-state, the constantly closing contact 63b of the relay 63 closed the circuit, so that the relay 68 connected thereto is turned on. As a result, the constantly opening contact 68a of the relay 68 connected to the operation detecting line 71 closes the circuit. At this time, since the three-position switches 61 and 62 are not operated, the operation detecting contacts 61-1 and 62-1 close the circuit. Thus, the electric current is supplied to the relay 63 to excite and turn on the relay 63 and sore the condenser 65. As a result, the constantly opening contact 63a3 of the relay 63 closes the circuit and the operation detecting contacts 61-2 and 62-2 of the three-position switches also close the circuit, so that a self-holding circuit to the relay 63 is formed. When the relay 63 is turned on, the constantly closing contact 63b thereof opens the circuit. Thus, the relay 68 is turned off. At this time, a discharge is carried out to the relay 68 from the condenser 70 for a prescribed time. Accordingly, even after the relay 63 is turned on, the off-state of the relay 68 is delayed for a prescribed time to prevent the formation of the self-holding circuit of the relay 63 from being failed. After the prescribed time passes (after the discharge of the condenser 70 is finished), the constantly opening contact 68a of the relay 68 connected to the operation detecting line 71 opens the circuit. However, as described above, since the self-hold is established by the circuit of the both switch operation detecting line 73 and the constantly opening contact 63a3 of the relay 63, the on-state of the relay 63 is maintained.

Under this state, since the constantly opening contact 63a1 of the relay 63 and the constantly closing contact 68b1 of the relay 68 to which the enable contacts 61-4 and 62-4 are connected close the circuit, the state of the enable contacts 61-4 and 62-4 becomes a stand-by state in which the enable contact output signal can be outputted. The enable contact output signal of other enable contacts 61-5 and 62-5 can be also outputted.

Since both the three position switches 61 and 62 are not operated, the enable contacts open the circuit. Thus, an inhibiting state 1 (state 1) for inhibiting the operation of the device is established.

Now, an operation when the three-position switches 61 and 62 are operated will be described below. Firstly, as an ordinary operation, when a teaching operator grips the teach pendant by one hand (for instance, left hand), the operator presses down the three-position switch 61 for a left hand. As a result, the operation detecting contacts 61-1 and 61-2 open the circuit. However, since the three-position switch 62 for a right hand is not operated, the operation detecting contact 62-2 closes the circuit and the self-hold of the relay 63 connected thereto is established and maintained. Then, the teaching operator grips the teach pendant and the three-position switch 61 for a left hand is placed at the second operating position, the enable switches 61-4 and 61-5 close the circuit to output the enable contact output signal and obtain the permitting state 1 (state 2) for permitting the operation of the device.

During the operation of the device under the above-described permitting state 1, when the operator strongly grips the three-position switch 61 for a left hand due to a cause such as a surprise for the operation of the device that is not anticipated to place the switch at the third operating position, the third operating position detecting contact 61-3 of the three-position switch 61 for a left hand opens the circuit. Thus, the relay 66 connected thereto is turned off and the constantly opening contact 66a thereof opens the circuit. The relay 63 connected thereto is also turned off so that the above-described self-hold is cancelled. As a result, the constantly closing contact 63b of the relay 63 closes the circuit and electric current is supplied to the relay 68 connected thereto to excite and turn on the relay 68. The constantly opening contacts 63a1 and 63a2 of the relay 63 and the constantly closing contacts 68b1 and 68b2 of the relay 68 in the circuits of the enable contact output signals open the circuits. Even when the enable contacts 61-4, 61-5, 62-4 and 62-5 close the circuits owing to welding, the outputs of the enable contact output signals are interrupted to have an inhibiting state 4 (state 3) for inhibiting the operation of the device. At this time, the electric charge stored in the condenser 65 is discharged through the constantly closing contact 66b of the relay 66 closing the circuit.

When one hand gripping the teach pendant is changed to the other hand during the operation of the device in the above-described permitting state 1, both the three-position switches 61 and 62 are placed at the second positions once, and then, the three-position switch 61 for a left hand is released.

Firstly, when both the three-position switches 61 and 62 are placed at the second operating positions, the operation detecting contacts 61-1, 61-2, 62-1 and 62-2 open the circuit to interrupt the supply of power to the operation detecting line 71 and the both switch operation detecting line 73. Thus, the condenser 65 begins to discharge to delay the off-state of the relay 63 for a prescribed time. That is, the relay 63 maintains an on-state and the relay 68 connected to the constantly closing contact 63b thereof also maintains an off-state. Accordingly, since the constantly opening contacts 63a1 and 63a2 of the relay 63 and the constantly closing contacts 68b1 and 68b2 of the relay 68 in the circuits of the enable contact output signals keep closing the circuits, the states of the enable contacts 61-4, 61-5, 62-4, and 62-5 become a permitting state 3 (state 4) that the enable contact output signals are outputted to permit the operation of the device.

Then, when the three-position switch 61 for a left hand is released, the operation detecting contact 61-2 closes the circuit so that the power is supplied to the relay 63 again to maintain the self-holding circuit to the relay 63. At this time, the constantly opening contacts 63a1 and 63a2 of the relay 63 and the constantly closing contacts 681 and 68b2 of the-relay 68 in the circuits of the enable contact output signals keep closing the circuits, and the states of the enable contacts 62-4 and 62-5 closing the circuits become a permitting state 2 (state 5) that the enable contact output signals are outputted to permit the operation of the device.

When the above-described permitting state 3 is maintained, the relay 63 is turned off for a prescribed time owing to the discharge of the condenser 65, the constantly closing contact 63b closes the circuit and the relay 68 connected thereto is turned on. Since the constantly opening contacts 63a1 and 63a2 of the relay 63 and the constantly closing contacts 68b1 and 68b2 of the relay 68 in the circuits of the enable contact output signals open the circuits, even when the enable contacts 61-4, 61-5, 62-4 and 62-5 of the three-position switches 61 and 62 close the circuits, the outputs of the enable contact output signals are interrupted to have an inhibiting state 2 (state 6) for inhibiting the operation of the device.

From the above-described permitting state 3, for instance when the operator strongly grips the three-position switch 62 for a right hand to place the switch at the third operating position due to a cause such as a surprise for the movement of the device that is not expected, the third operating position detecting contact 62-3 of the three-position switch 62 for a right hand opens the circuit, so that the power of the relay 66 connected thereto is interrupted to be turned off. The constantly opening contact 66a opens the circuit to turn off the relay 63 and turn on the relay 68 connected to the constantly closing contact 63b. Since the constantly opening contacts 63a1 and 63a2 of the relay 63 and the constantly closing contacts 68b1 and 68b2 of the relay 68 in the circuits of the enable contact output signals open the circuits, even when the enable contacts 61-4 and 61-5 of the three-position switch 61 closes the circuits, the outputs of the enable contact output signals are interrupted to have an inhibiting state 8 (state 7) for inhibiting the operation of the device. At this time, the electric charge stored in the condenser 65 is discharged through the constantly closing contact 66b of the relay 66.

Even when the three-position switch 62 for a right hand is returned to the second operating position from the above-described inhibiting state 8, since the condenser 65 already performs a discharge so that the condenser has no energy for turning on the relay 63 again even if the condenser does not completely discharge. Thus, the relay 63 maintains its off-state. At this time, the relay 68 is turned on to have the inhibiting state 2 (state 6) that the enable contact output signals are not outputted to inhibit the operation of the device.

When the inhibiting state 2 to an inhibiting state 9 except the inhibiting state 1 (state 1) are established once, the constantly opening contacts 63a1 and 63a2 of the relay 63 and the constantly closing contacts 68b1 and 68b2 of the relay 68 connected to the enable contact output signal circuits open the circuits. Thus, the enable contact output signals cannot be outputted. To close the constantly opening contacts 63a1 and 63a2 of the relay 63 and the constantly closing contacts 68b1 and 68b2 of the relay 68 connected to the enable contact output signal circuits, both the three-position switches 61 and 62 need to be located at the first operating positions and released. To place both the three-position switches 61 and 62 at the first operating positions means to completely open the operation detecting contacts 61-1, 61-2, 62-1 and 62-2 thereof and the third operating position detecting contacts 61-3 and 62-3. This state is the same as that when the voltage 24V of the power source is initially turned on. As a result of the operations of the relays 63, 66 and 68, the constantly opening contact 63a1 of the relay 63 and the constantly closing contact 68b1 of the relay 68 to which the enable contacts 61-4 and 62-4 are connected close the circuit so that the states of the enable contacts 61-4 and 62-4 become stand-by states that the enable contact output signal can be outputted.

The enable contact output signal of the other enable contacts 61-5 and 62-5 can be also outputted in the same manner as described above (state 1).

For instance, as for a transition path from the inhibiting state 2 (state 6) to the inhibiting state 1 (state 1), the three position switches 61 and 62 for left and right hands are kept released to place the switches at the first operating positions. Depending on the difference in timing for releasing the right and left hands, a path is used that the inhibiting state 2 (state 6) returns to the inhibiting state (state 1) via an inhibiting state 3 or an inhibiting state 6.

As described above, when the teach pendant is shifted from one hand to the other during the operation of keys by holding the teach pendant by both the hands, the three-position switches are placed at the second operating positions once by both the hands. Then, even when one hand is released, the one hand gripping the teach pendant can be smoothly changed to the other hand without making the operation of a robot to be inhibited. At this time, when at least one three-position switch is placed at the third operating position due to a factor such as en encounter with a dangerous state, the operation is immediately shifted to the inhibiting state so that the operation can be inhibited. Thus, the operation with a high safety can be realized.

Further, to detect the third operating position of at least one three-position switch and assuredly interrupt the output of the enable contact output signal and cancel the interruption, the return of both the three-position switches to the first operating positions is detected to close the output circuits of the enable contact output signals, that is, cancel the interruption. Accordingly, when the outputs of the enable contact output signals are interrupted once, the outputs of the enable contact output signals can be assuredly interrupted irrespective of the shift timings of the states of the contacts due to switching of the operating positions of the three-position switches or the shift timings of the states of the contacts due to switching of on and off of the relays.

SECOND EMBODIMENT

Figure 3:
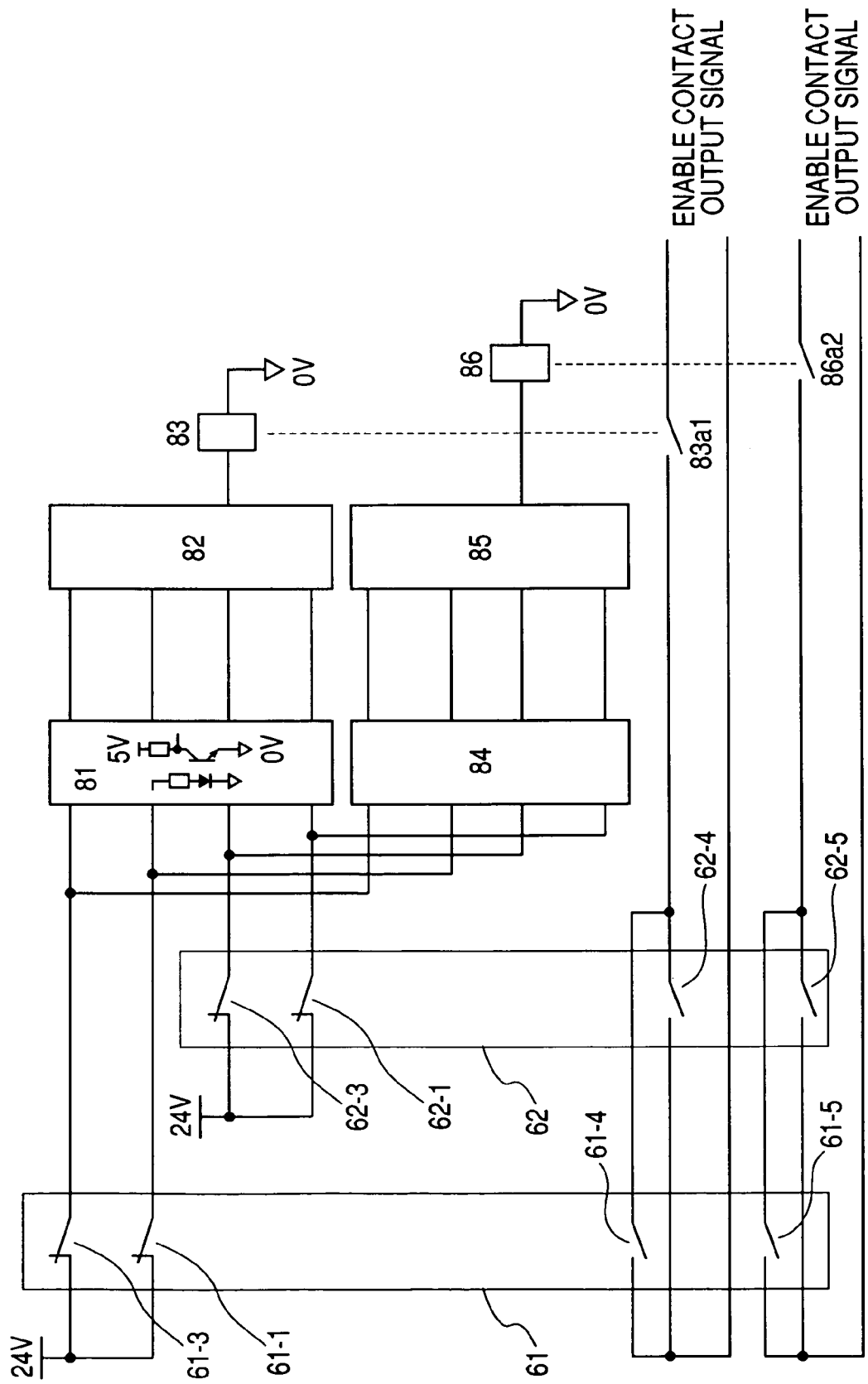
[FIG. 3] is a circuit block diagram of a second embodiment for embodying the present invention.

FIG. 3 is a circuit block diagram of a second embodiment for embodying the present device. This circuit is divided and provided in a teach pendant that is not shown in the drawing or the teach pendant and a device that is not illustrated like the first embodiment.

Reference numerals 61 and 62 designate three-position switches and are the same as those of the first embodiment. Therefore, an explanation thereof will be omitted. In this embodiment, operation detecting contacts 61-2 and 62-2 are not used.

Reference numerals 81 and 84 are voltage converters that input dc 24V through auxiliary contacts of the three-position switches, convert the dc 24V to a dc 5V signal and output the dc 5V signal. In this embodiment, a photo-coupler is employed and when the dc 24V is inputted, 0V is outputted. When an input is 0V, 5V is outputted. The operation detecting contacts 61-1 and 62-1 and the third operating position detecting contacts 61-3 and 62-3 of the three-position switches 61 and 62 are connected to a power source of dc 24V in one side. They branch in parallel in the other side and are connected to the voltage converters 81 and 84.

A signal output from the voltage converter 81 is connected to a signal processing circuit 82. A signal is processed in the signal processing circuit 82 and a result is outputted to a relay 83.

Likewise, a signal out put from the voltage converter 84 is connected to a signal processing circuit 85. A signal is processed in the signal processing circuit 85 and a result is outputted to a relay 86. The relay 83 and the relay 86 are connected to 0V in the other side.

The enable contact 61-4 of the three-position switch 61 for a left hand is connected in parallel with the enable contact 62-4 of the three-position switch 62 for a right hand and connected in series to a constantly opening contact 83a1 of the relay 83 to form an enable contact output signal.

Similarly, the enable contact 61-5 of the three-position switch 61 for a left hand is connected in parallel with the enable contact 62-5 of the three-position switch 62 for a right hand and connected in series to a constantly opening contact 86a2 of the relay 86 to form an enable contact output signal.

FIG. 4 shows a signal processing table of the signal processing circuits 82 and 85 in this embodiment. In the drawing, contact states show input signals of the signal processing circuits 82 and 85. The contacts states of the operation detecting contacts 61-1 and 62-1 and the third position detecting contacts 61-3 and 62-3 of the three-position switches 61 and 62 indicate 0 in a circuit closing state, 1 in a circuit opening state and "arbitrary" when no problem arises whether the circuit opens or closes.

An inner state of the signal processing circuit indicates the inner state of the signal processing circuits 82 and 85. An on-state is represented by 1, an off-state is represented by 0 and an state that may be on or off state is represented by "arbitrary".

When a controlling power is inputted to the signal processing circuits 82 and 85, a power-on state shows 1. When the power-on state indicates 1, a relay output is turned off (state 11).

When all the contact states 61-2, 61-3, 62-1 and 62-3 indicate 0, the power-on state indicates 0 as an off-state. At this time, an inhibition detecting state and a timing state indicate 0 at the same time and a time excess state also shows 0 (state 12).

The inhibition detecting state sows 1 as an on-state when the contact state 61-3 indicates 1 (state 17), the contact state 62-3 indicates 1 (state 18) or a time elapse state shows 1 (state 16). When all the contact states 61-1, 61-3, 62-1 and 62-3 indicate 0, the inhibition detecting state shows 0 as the off-state.

When the inhibition detecting state shows 1, the relay output is turned off.

The timing state shows 1 when the contact states 61-1 and 62-1 show 1 and the contact states 61-3 and 62-3 indicate 0 (state 15). The timing state shows 0 except the above-described states. That is, when both the two three-position switches are operated to be located at the second operating positions, the timing state shows 1 as the on state.

When the timing state indicates 1, the timing of a prescribed time is started. During the timing operation, when at least one of the two three-position switches is located at the first operating position, the timing state shows 0. When the timing operation is stopped, a timing value is cleared (state 12, state 13, state 14).

When the timing state indicates 1 and the prescribed time passes, the time excess state shows 1 and the inhibition detecting state indicates 1 as described above (state 16).

The relay output is turned on when the contact states 61-1 and/or 62-1 indicate 1 and all the power-on state, the inhibition detecting state and the time excess state show 0 (state 14, state 14, state 15).

A signal process in the signal processing circuits 82 and 85 will be described in accordance with the operation of the teach pendant.

When a control power source is turned on, the power-on state indicates 1 irrespective of an input state and the relay output is turned off (state 11).

When both the three-position switches 61 and 62 are opened to place the switches at the first operating positions, the contact states 61-1, 62-1, 61-3 and 62-3 indicate 0 and the power-on state shows 0. At this time, the relay output is turned off (state 12).

When the three-position switch 61 for a left hand is operated to be located at the second operating position from the state 12, the contact state 61-1 indicates 1 and the relay output is turned on (state 13).

When the three-position switch 62 for a right hand is operated to be located at the second operating position from the state 12, the contact state 62-1 indicates 1 and the relay output is turned on (state 14).

When both the three-position switches 61 and 62 are operated to be located at the second operating positions, the relay output is turned on, however, the timing state shows 1 to start a timing operation.

When one three-position switch 61 or 62 is released to be located at the second operating position from the state 15, the contact state 61-1 or 62-1 indicates 0. At this time, the relay output maintains its on-state (state 13 or state 14).

When the state 15 is maintained, since the timing state indicates 1, the timing operation progresses. When a prescribed time passes, the time excess state shows 1 and the inhibition detecting state also shows 1. At this time, the relay output is turned off (state 16).

When at least one three position switch 61 or 62 is placed at the third operating position from any of the states during an ordinary teaching operation, the contact state 61-3 or 62-3 indicates 1 and an inhibiting state of 1 is established. At this time, the relay output is turned off (state 17 or state 18).

When both the three-position switches 61 and 62 are opened to place the switches at the first operating positions from the states 16, 17 and 18 having the inhibition detecting state of 1, the contact states 61-1, 62-1, 61-3 and 62-3 indicate 0, and the inhibition detecting state, the timing state and the time excess state show 0. The relay output at this time is turned off (state 12).

In this embodiment, the signal process in the signal processing circuits 82 and 85 is described. The signal processing circuits 82 and 85 may be readily realized by combining logic elements on the basis of the above-description. Further, when a logic operation element such as a CPU is employed to perform the signal process, the same effects can be realized.

INDUSTRIAL APPLICABILITY

The present invention is applied to a safety device when an operator comes near to an automatic machine operating in accordance with the power of a motor or to an operating switch for instructing the operation of the automatic machine, so that the safety of the operator can be ensured and the reliability of the device can be improved.

The invention claimed is:
1. A control method for a teach pendant,
the teach pendant including: two three-position switches respectively having three operating positions of first operating positions, second operating positions and third operating positions in accordance with pressing-down strokes,
each of the three-position switches having: a detecting unit for detecting the first operating position and the third operating position to permit or inhibit the operation of a device in accordance with the operating positions, the control method comprising:

a step of inhibiting the operation of the device, when both the three-position switches are located at the second operating positions for a time exceeding a prescribed time.

2. The control method for a teach pendant according to claim 1, wherein when both the three-position switches are located at the second operating positions from the first operating positions, the measurement of time is started, and while the measured time is smaller than the prescribed time, when at least one of the three-position switches is located at the position of above-described other positions, the measurement of the time is stopped.

3. A control device for a teach pendant, the teach pendant including: two three-position switches respectively having three operating positions of first operating positions, second operating positions and third operating positions in accordance with pressing-down strokes, each of the three-position switches including: a signal processing circuit having a detecting contact for detecting the first operating position and the third operating position to permit or inhibit the operation of a device in accordance with the operating positions, wherein the signal processing circuit has detecting contact signals of the three-position switches as inputs to establish an inhibiting state of the operation of the device when both the three-position switches are located at the second operating position for a time exceeding a prescribed time, and to allow both the three-position switches to be located at the first operating positions to cancel the inhibiting state of the operation of the device.

4. The control device for a teach pendant according to claim 3, wherein the signal processing circuit includes a circuit having a relay.

5. The control device for a teach pendant according to claim 3, wherein the signal processing circuit includes a circuit having either a logic element or a logic operation element.

6. The control device for a teach pendant according to claim 3, wherein the signal processing circuit is arranged in a teach pendant main body or the device.

* * * * *